US006397382B1

(12) United States Patent
Dawson

(10) Patent No.: US 6,397,382 B1
(45) Date of Patent: May 28, 2002

(54) DYNAMIC SOFTWARE CODE INSTRUMENTATION WITH CACHE DISABLING FEATURE

(75) Inventor: Peter S. Dawson, Canton, MA (US)

(73) Assignee: Wind River Systems, Inc., Alameda, CA (US)

( * ) Notice: Subject to any disclaimer, the term of this patent is extended or adjusted under 35 U.S.C. 154(b) by 0 days.

(21) Appl. No.: 09/310,441

(22) Filed: May 12, 1999

(51) Int. Cl.[7] .............................................. G06F 9/44
(52) U.S. Cl. .................... 717/130; 717/158; 711/138; 711/139
(58) Field of Search ................... 717/4, 130, 124, 717/125, 126, 127, 128, 129, 158; 711/138, 139, 140, 144, 145, 141, 142, 143, 146

(56) References Cited

U.S. PATENT DOCUMENTS

| 5,030,959 A | * | 7/1991 | Hayden ....................... 342/373 |
| 5,182,811 A | * | 1/1993 | Sakamura .................... 710/264 |
| 5,212,794 A | | 5/1993 | Pettis et al. ..................... 717/9 |
| 5,313,608 A | | 5/1994 | Takai ............................. 717/9 |
| 5,363,497 A | * | 11/1994 | Baker et al. ................. 711/153 |
| 5,493,664 A | | 2/1996 | Doi ................................ 717/9 |
| 5,530,804 A | | 6/1996 | Edgington et al. ............... 717/9 |
| 5,537,536 A | * | 7/1996 | Groves .......................... 714/28 |
| 5,560,036 A | | 9/1996 | Yoshida .......................... 717/9 |
| 5,561,761 A | | 10/1996 | Hicok et al. .................... 717/9 |
| 5,581,695 A | | 12/1996 | Knoke et al. .................... 717/9 |
| 5,654,962 A | * | 8/1997 | Rostoker et al. ............. 370/232 |
| 5,710,724 A | * | 1/1998 | Burrows ....................... 714/34 |
| 5,737,516 A | | 4/1998 | Circello et al. ................ 717/9 |
| 5,748,878 A | | 5/1998 | Rees et al. ..................... 717/9 |
| 5,751,942 A | * | 5/1998 | Christensen et al. .......... 714/38 |
| 5,768,500 A | * | 6/1998 | Agrawal et al. .............. 714/47 |
| 5,850,562 A | * | 12/1998 | Crump et al. .................. 713/1 |
| 5,894,575 A | * | 4/1999 | Levine et al. ............... 395/704 |
| 5,896,538 A | * | 4/1999 | Blandy et al. .............. 395/704 |
| 5,900,014 A | * | 5/1999 | Bennett ....................... 711/138 |
| 5,940,618 A | * | 8/1999 | Blandy et al. .............. 395/704 |
| 5,943,498 A | * | 8/1999 | Yano et al. .................. 395/704 |
| 5,960,198 A | * | 9/1999 | Roediger et al. ........... 395/704 |
| 5,963,543 A | * | 10/1999 | Rostoker et al. ............ 370/232 |
| 6,009,270 A | * | 12/1999 | Mann .......................... 395/704 |
| 6,041,406 A | * | 3/2000 | Mann .......................... 712/227 |
| 6,119,206 A | * | 9/2000 | Tatkar et al. ................ 711/147 |
| 6,142,683 A | * | 11/2000 | Madduri ...................... 395/704 |
| 6,145,122 A | * | 11/2000 | Miller et al. .................... 717/4 |
| 6,145,123 A | * | 11/2000 | Torrey et al. ................... 717/4 |
| 6,185,732 B1 | * | 2/2001 | Mann et al. .................... 717/4 |
| 6,189,141 B1 | * | 2/2001 | Benitez et al. ................. 717/4 |
| 6,223,338 B1 | * | 4/2001 | Smolders ....................... 717/4 |

OTHER PUBLICATIONS

IBM Technical Bulletin, vol. 31 No. 1 Jun. 1988, Dual Indirect RAM/ROM JUMP Tables for Firmware Updates, pp. 294–298.*
IBM Technical Bulletin, vol. 39. No. 6, Jun. 1996, Transition Records for Tracing Program Flows.*
Microsift Press, Computer Dictionary second edition, pp. 218–219, interlacing and interleaving terms.*

* cited by examiner

Primary Examiner—Tuan Q. Dam
Assistant Examiner—Todd Ingberg
(74) Attorney, Agent, or Firm—Joseph Palmieri; Felix D'Arienzo; Sampson & Associates, P.C.

(57) ABSTRACT

A method and system of monitoring code as it is executed by a target processor is provided for debugging, etc. Standardized software code function preamble and postamble instructions are dynamically replaced with instructions that will generate a predetermined exception. The exception generates a branch to a conventional exception vector table. An exception routine is inserted into the vector table, and includes instruction(s) to disable the data and/or address caches. Subsequent instructions in the vector table execute the replaced preamble instruction and, with or without re-enabling the cache, branch back to the address of the program code immediately following the faulted preamble address. Instructions of the function executed while cache is disabled are executed on the bus where they are visible, as opposed to within cache.

30 Claims, 12 Drawing Sheets

| Display | ⬡ | FROM # 0 | TO # 500 | in Function Mode ▾ | More | NEW Win | Net Time 7.24 μsec |

INSTRUCTION CACHE TOGGLE ENABLED    DATA CACHE TOGGLE ENABLED

☐☐☐☐☐☐☐☐ …calendar.c\daysBetween—57 30.84 μsec
☐☐☐☐☐☐☐☐ calendar.c\calendar—61
☐☐☐☐☐☐☐☐ …calendar.c\daysBetween—57 31.08 μsec
☐☐☐☐☐☐☐☐ calendar.c\calendar—61
☐☐☐☐☐☐☐☐ …calendar.c\daysBetween—57 30.92 μsec
☐☐☐☐☐☐☐☐ calendar.c\calendar—61
☐☐☐☐☐☐☐☐ …calendar.c\daysBetween—57 31 μsec
☐☐☐☐☐☐☐☐ calendar.c\calendar—61
☐☐☐☐☐☐☐☐ …calendar.c\daysBetween—57 30.96 μsec
☐☐☐☐☐☐☐☐ calendar.c\calendar—61
☐☐☐☐☐☐☐ 175: numOfDays - daysBetween( &firstDate, &secondDate );
☐☐☐☐☐☐☐☐ …calendar.c\daysBetween—57 30.92 μsec
☐☐☐ 289:—58 7.16 μsec
☐☐☐ 310:—59 23.76 μsec
☐☐☐☐☐☐☐☐ calendar.c\calendar
☐☐☐☐☐☐☐☐ …calendar.c\daysBetween 40.52 μsec

| > BKM > | OFFLINE | LEVEL 0 | VTE | NO TRACE ACQUISITION | 016384 NEW | NO LAST EVENT |

TRACE DISPLAY COMPLETE.

| Display | ◇ | FROM # 0 | TO # 300 | in Function Mode ▾ | More | NEW Win | Net Time |

INSTRUCTION CACHE TOGGLE [ENABLED]   DATA CACHE TOGGLE [ENABLED]

| | | Net Time |
|---|---|---|
| ☐ | ...calendar.c\dayOfYear | 4.28 μsec |
| ☐ | ........strutils.c\strcmp | 4.84 μsec |
| ☐ | 50: ( | 3.8 μsec |
| ☐ | 57: ) | 1.04 μsec |
| ☐ | ...calendar.c\dayOfYear | 4.2 μsec |
| ☐ | 206: status = strcmp( monthDate->monthName, year1997.month[n].monthName ); | |
| ☐ | 208: if ( status == STRING_MATCH ) | 0.16 μsec |
| ☐ | 223: daySum = daySum + year1997.month[n].numOfDays; | 0.16 μsec |
| ☐ | 214: if ( monthDate-> <= year1997.month[n].numOfDays ) | 0.16 μsec |
| ☐ | 223: daySum = daySum + year1997.month[n].numOfDays; | 0.72 μsec |
| ☐ | 199: for ( n=0, daySum=0; n < TWELVE_MONTHS ;n++ ) | 0.36 μsec |
| ☐ | 206: status = strcmp( monthDate->monthName, year1997.month[n].monthName ); | |
| ☐ | 206: status = strcmp( monthDate->monthName, year1997.month[n].monthName ); | |
| ☐ | ........strutils.c\strcmp | 4.84 μsec |
| ☐ | 50: ( | 3.96 μsec |
| ☐ | 57: ) | 0.88 μsec |
| ☐ | ...calendar.c\dayOfYear | 4.52 μsec |
| ☐ | ........strutils.c\strcmp | 3.6 μsec |

> BKM >  OFFLINE  LEVEL 0  VTE  NO TRACE ACQUISITION  016384 NEW  NO LAST EVENT

68 —
72 —
70 —

DYNAMIC SOFTWARE CODE INSTRUMENTATION WITH CACHE DISABLING FEATURE

BACKGROUND OF THE INVENTION

1. Field of the Invention

This invention relates to software analysis, and more particularly to a method and apparatus for dynamically instrumenting software executing on embedded systems for analysis thereof.

2. Background Information

A wide variety of hardware and/or software systems for generating an exception to debug, test and/or emulate a target processor are known in the art. Such systems provide their functionality using many disparate technologies.

For example, U.S. Pat. No. 5,560,036 to Yoshida; U.S. Pat. No. 5,737,516 to Circello et al.; U.S. Pat. No. 5,530,804 to Edgington et al., (the '804 patent); and U.S. Pat. No. 5,493,664 to Doi, all disclose processors having hardware or software integrated therein which facilitates debugging. A drawback of these approaches, however, is that they are not readily usable in connection with processors not originally manufactured with integrated debugging capabilities. For example, The '804 patent discloses a processor having two modes of operation, one being a normal mode and the other being a debug, test or emulator mode of operation which is entered via an exception/interrupt. In this approach, a "generate debug mode exception" (GDMI) may be included in the processor's instruction set. Disadvantageously, this approach is integrated into the processor rather than being suitable for use with processors not originally manufactured with such integrated systems.

U.S. Pat. No. 5,748,878 to Rees et al., (the '878 patent) discloses a software analysis system for capturing tags generated by tag statements in instrumented source code. This software analysis system includes a probe that monitors the address and data bus of the target system. When a tag statement is executed in the target system, a tag is written to a predetermined location in the address space of the target system. In this manner, instructions executing from internal cache memory which are not reflected on externally accessible buses, may be monitored. A drawback of this approach, however, is that discrete tag statements, which tend to disadvantageously increase the number of executable lines of the code, must be included within the source code. These discrete tags disadvantageously increase the size of the code in proportion to the number of functions instrumented. Moreover, although the tags may be monitored, the code continues to be executed within cache, and thus is not directly observable.

Thus, a need exists for an improved debugging/emulation system capable of overcoming the drawbacks of the prior art.

SUMMARY OF THE INVENTION

According to an embodiment of this invention, a method for monitoring software code being executed in a target system having a bus and cache, includes the steps of:

(a) searching a range of addresses within the software code to identify a desired instruction;

(b) replacing the desired instruction with an exception-generating instruction;

(c) inserting an exception routine into an exception vector table, the exception routine having a cache-disabling instruction and a branch instruction branching to an address of the software code subsequent to the exception-generating instruction; and (d) executing the software code.

In a second aspect of the present invention, a method for monitoring software code being executed in a target system having a bus and cache includes the steps of:

(a) searching a range of addresses within the software code to identify preamble and postamble instructions;

(b) replacing the preamble instruction with a misalignment instruction;

(c) replacing the postamble instruction with an other misalignment instruction;

(d) inserting an exception routine into an exception vector table executable upon a branch from a faulted address, the exception routine having a cache-disabling instruction, an instruction to execute the instruction replaced from the faulted address, a branch instruction branching to an address of the software code subsequent to the faulted address, and a decoding instruction to indicate entry of a function when the address of the misalignment instruction is faulted and to indicate exit of a function when the address of the other misalignment instruction is faulted; and (e) executing the software code, wherein at least a portion of the software code will execute externally of the cache.

In a third aspect of the present invention, a system is provided for monitoring software code being executed in a target having a bus and cache. The system includes an instruction locating module which searches a range of addresses within the software code to identify a desired instruction, and an instruction replacement module which replaces the desired instruction with an exception-generating instruction. The system also includes a vector table instrumentation module which inserts an exception routine into an exception vector table, the exception routine having a cache-disabling instruction and a branch instruction branching to an address of the software code located subsequent to the exception-generating instruction.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 8 is a screen display of results of the operation of the present invention shown in FIG. 7;

FIG. 10 is a screen display of the results of the operation of the present invention shown in FIG. 9;

FIG. 12 is a screen display of the results of the operation of the present invention shown in FIG. 11.

DETAILED DESCRIPTION OF THE PREFERRED EMBODIMENTS

Figure 1:
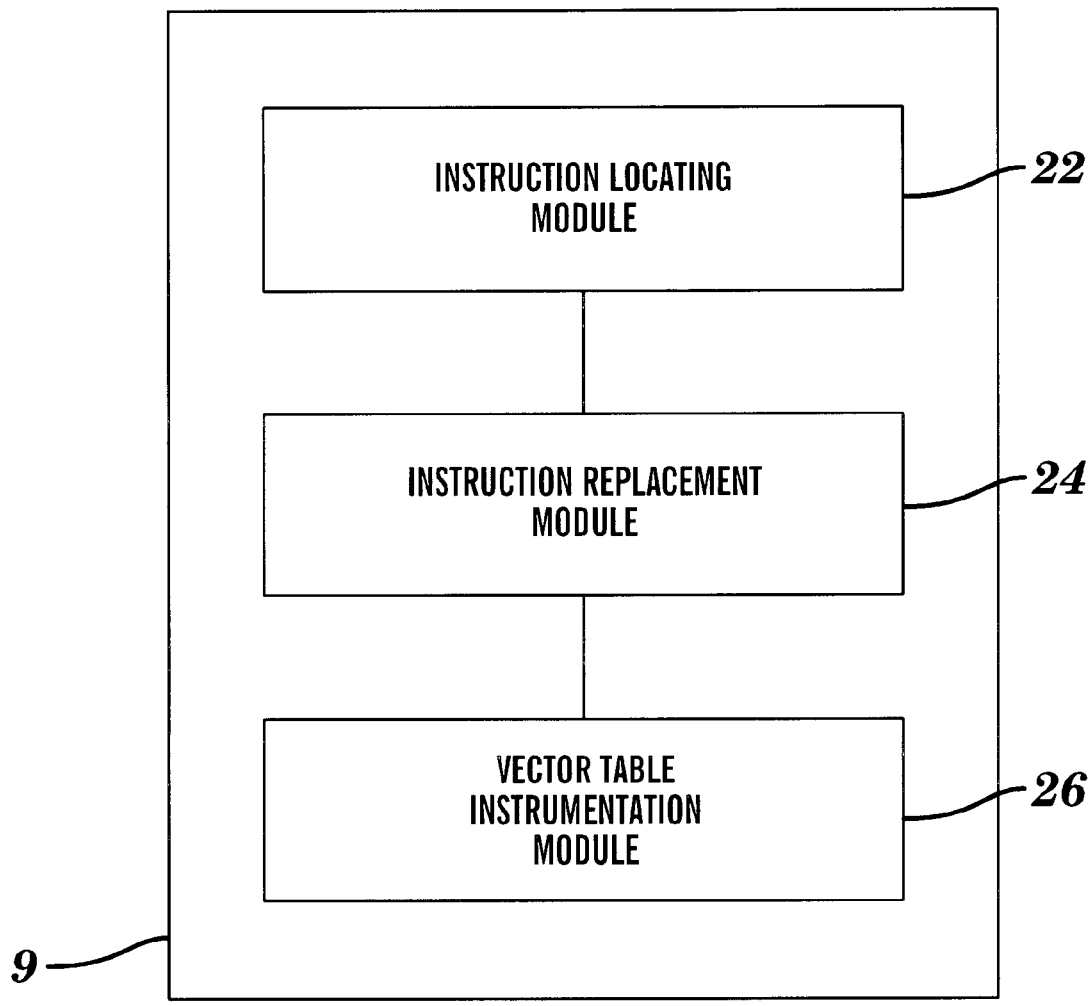
FIG. 1 is a block diagram/flow chart of an example of the code monitoring system of the present invention.

Referring to the figures set forth in the accompanying Drawings, the illustrative embodiments of the present invention will be described in detail hereinbelow. For clarity of exposition, corresponding or analogous features shown in the accompanying drawings shall be indicated with like reference numerals and similar features such as shown in alternate embodiments in the drawings shall be indicated with similar reference numerals.

Figure 2:
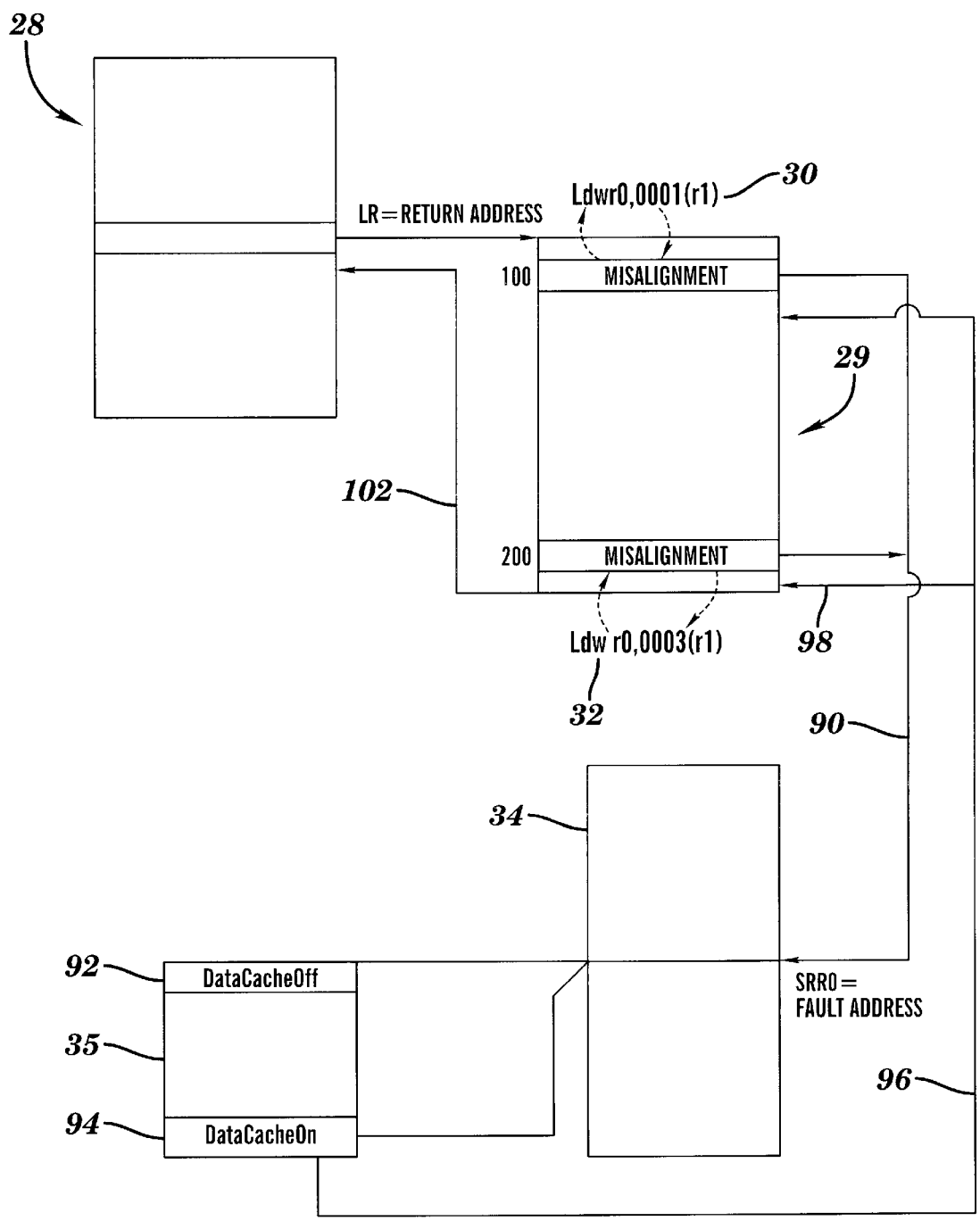
FIG. 2 is a block diagram/flow chart of an example of operations performed by the code monitoring system of FIG. 1.

Briefly described, as best shown in FIG. 2, the present invention includes a system and method of monitoring software code as it is executed by a target CPU for debugging, etc. Standardized software code function (or module) preamble and postamble instructions such as shown at 30 and 32 are dynamically replaced (i.e., replaced after compiling and prior to execution) with instructions that will generate a predetermined exception or interrupt. This exception is of a type included in the standard instruction set of the target processor, such as a misalignment exception. The exception thus generates a branch 90 to a conventional exception vector table 34. An exception routine 35 is inserted into the vector table, which may include any of several instructions, such as disabling the Data Cache (as at 92) and/or Instruction Cache. Subsequent instructions in the vector table execute the replaced preamble instruction and then, with or without re-enabling the cache as at 94, branch back to an address of the program code module immediately following the faulted preamble address as shown at 96. Instructions of the function 29 executed while cache is disabled are executed on the bus where they are visible, as opposed to within cache. The function 29 continues to execute until the substitute postamble instruction 32 generates a second misalignment exception. This second exception will branch the program (as at 90) back to the exception table 34 which executes as discussed hereinabove and then re-enables the cache at 94. At this point, the vector table 34 branches back to an address of the program code immediately following the faulted postamble instruction as shown at 98 and then to the calling function 28 as shown at 102 to enable the remainder of the program to run in a normal, full speed (cache-enabled) fashion.

Advantageously, the present invention provides the flexibility to selectively instrument various portions of the code at run time, to avoid having to execute previously debugged code at the less than optimum levels of performance typically associated with disabled cache. Moreover, the present invention enables such instrumentation nominally without "padding" the individual code functions with additional instructions. Rather, the functionality of the present invention is provided by adding instructions only to the exception vector table 34. Thus, multiple software functions or modules may be instrumented nominally without any more overhead (i.e., added instructions) than that associated with instrumenting a single function.

Referring to the Figures, the present invention will now be described in greater detail. As shown in FIG. 1, the invention includes an instrumentation block 9 which further includes an instruction locating module 22 coupled to an instruction replacement module 24 which is in turn coupled to a vector table instrumentation module 26. Instruction locating module 22 scans a block of program code within a user designated address range or ranges to locate predetermined instructions. Examples of such predetermined instructions include those used to designate a preamble and/or a postamble of a code block or function. Once the preamble and/or postamble of the code block has been located, instruction replacement module 24 replaces the instructions with substitute instructions designed to generate an exception of a type commonly included in the instruction set of the target microprocessor. An example of such an exception is a misalignment exception which occurs when the processor attempts to read from an odd numbered address. Although the present invention is described herein with respect to misalignment exceptions, it should be understood by those skilled in the art that other types of standard exceptions may be utilized without departing from the spirit and scope of the present invention.

The vector table instrumentation module 26 serves to instrument (add instructions to) the standard exception vector table by inserting an exception routine 35 (FIG. 2) therein, as will be discussed in greater detail hereinbelow.

Turning now to FIG. 2, an example of the operation of an embodiment of the present invention is shown. Initially, instruction locating module 22 utilizes conventional searching techniques to locate standard EABI (Embedded Application Binary Interface) preamble and postamble instructions which occur at the beginning and ending, respectively, of a function. In particular, the invention may search for the MFSPR (move from special register) instruction which occurs in the preamble and the MTSPR (move to special register) instruction which occurs in the postamble of each function. These instructions are preferably chosen because they are standard EABI commands present in any software intended to be compliant with a number of platforms, including Motorola® PowerPC™, other Motorola® platforms, and Internet compatible platforms. The MFSPR and MTSPR instructions are thus included in the standard instruction set for nominally all EABI compatible processors.

For example, an 'MFSPR r0, lr' instruction (not shown) originally located at address 100 of instrumented function 29 instructs the processor to take the address in a link register of main program 28 (i.e., the calling function) and insert it into the r0 register, while an 'MTSPR lr, r0' instruction (not shown) at address 200 of function 29 instructs the processor to take the value in the r0 register and insert it back into the link register. In operation, the user may select an address range to be searched, to for example, search for functions disposed within, or called by instructions within, the range of addresses, i.e., between 0 and 300. Once the preamble and postamble instructions have found by the instruction locating module 22, instruction replacement module 24 replaces them with substitute instructions to generate misalignment exceptions. Examples of misalignment instructions and their codes are shown in the following Table 1:

TABLE 1

| Replacement Instruction | Decoded Meaning | Instruction Replaced | Action for Exception Routine |
|---|---|---|---|
| 30 Ldw r0,0001 (r1) | = entry to a function | MFSPR r0,lr | create entry marker only |
| 31 Ldw r0,0011 (r1) | = entry to a function and turn I-Cache off | MFSPR r0,lr | create entry marker and turn Instruction Cache off (to begin trace) |
| 37 Ldw r0,0021 (r1) | = entry to a function and turn I-Cache on | MFSPR r0,lr | create entry marker and turn Instruction Cache on (to end trace) |
| 32 Ldw r0,4001 (r1) | = exit from a function | MTSPR 1r,r0 | create exit marker only |
| 39 Ldw r0,4011 (r1) | = exit from a function and turn I-Cache off | MTSPR lr,r0 | create exit marker and turn Instruction Cache off (to begin trace) |
| 33 Ldw r0,4021 (r1) | = exit from a function and turn I-Cache on | MTSPR 1r,r0 | create exit marker and turn Instruction Cache on (to end trace) |

In the example shown in FIG. 2, the preamble and postamble instructions are replaced with substitute instructions 30 and 32 respectively. Instruction 30 effectively instructs the processor to increment the value in the r1 register by one and insert it into the r0 register.

In this regard, the skilled artisan will recognize that to be fetched properly, the value of the address in the r1 register should be an even number. Moreover, in PowerPC™ architecture the processor may only fetch from even numbered addresses in increments of eight. By inserting command 30, the processor will attempt to read from an odd-numbered address and thus generate a misalignment exception. The processor will then branch to the exception vector table 34. Once at vector table 34, the processor will execute the exception routine 35 inserted by the instrumentation module 26 (FIG. 1).

A preferred embodiment of the exception routine 35 is generally described in the following Table 2:

TABLE 2

1. Save current state of Data Cache and then Disable Data Cache
2. Read from start of exception routine
3. Read address of misalignment exception (in SRR0 Register)
4. Read Opcode which caused exception
5. Decode misalignment exception
   a. if ldw r0,0001 (r1) then read link register, execute MFSPR R0,LR, goto step 6
   b. if ldw r0,0011 (r1) then read link register, turn I-Cache off, execute MFSPR R0,LR, goto step 6
   c. if ldw r0,0021 (r1) then read link register, turn I-Cache on, execute MFSPR r0, LR, goto step 6
   d. if ldw r0,4001 (r1) execute MTSPR LR,RC, goto step 6
   e. if ldw r0, 4011 (r1) then turn I-Cache off, execute MTSPR LR, r0, goto step 6
   f. if ldw r0,4021 (r1) then turn I-Cache on, execute MTSPR LR,R0, goto step 6
6. Restore original state of Data Cache and then Read from start of exception routine +2
7. Enable Data Cache
8. Return to function at next instruction after exception The misalignment instruction causes a fault prior to actual execution thereof. The actual read from an odd address thus does not actually take place. The CPU automatically vectors to the misalignment exception routine 35 and automatically stores the faulted address in a special register, i.e., the "SRR0" register. Referring now to Table 2, after saving the current state of the Data Cache, the first instruction in the exception routine 35 disables the Data Cache as shown at step 1. The subsequent instruction at step 2 directs the processor to read the starting location (i.e., address 602 in the exemplary code listings included hereinbelow) of the exception routine 35 so that this read is visible on the external bus and is thus used to indicate to an external bus/state analyzer that the misalignment exception routine 35 has been entered. In this regard, the instruction will have been pre-fetched by the processor and stored in the Instruction Cache. (One skilled in the art will recognize that in conventional "Harvard" architecture, instruction "fetches" normally occur in Instruction Cache, while "reads" and "writes" will normally occur in Data Cache.) This read of the pre-fetched instruction at the starting location of routine 35 thus serves as a TAG or MARK which informs an external bus/state analyzer to capture the subsequent cycle of instructions being executed. The next step 3 is to read the faulted address stored in the "SRR0" register as shown at 40. The exception routine then reads the data at the location pointed to by the SRR0 register (i.e., the Opcode at the faulted address) as shown at step 4. Since the Data Cache has been previously disabled, the processor executes steps 3 and 4 on the external bus where they are visible by the conventional bus/state analyzer, i.e., an emulator/debugging hardware or software system.

As used herein, the phrase "executes on the bus" and/or "executes . . . on the external bus" indicates that transfer of information to and from the processor, such as an instruction fetch, read, and/or write, is effected using the bus.

Steps 5a–5f decode the data according to the Opcode which generated the exception, to determine which instruction was originally replaced and to determine what action to take, as indicated in Table 1 hereinabove. For example, if the Opcode includes a hexadecimal value of 0001, as shown in step 5a, this indicates the presence of misalignment exception 30 (Table 1), and according to Table 1, function 29 was entered and only a marker (without a trace) should be generated. (An example of such functionality will be discussed hereinbelow with respect to FIG. 8.) Alternatively, if the Opcode includes a hexadecimal value of 4001, as shown at step 5d, this indicates presence of misalignment exception 32 (Table 1), and that according to Table 1, a function 29 was exited and a marker should be generated.

Various additional instructions may be included in the exception routine 35 to provide additional functionality selectable by the user. For example, provision for decoding instructions 31 and 33 (FIG. 2) may be included as at steps 5b and 5f, to enable a user to instrument for entry and exit of functions and to trace the functions (i.e., view the execution of the functions). Instructions 37 and 39 also may be decoded as at steps 5c and 5e for use in called functions (i.e., children) for which a trace is not desired, as will be discussed in greater detail hereinbelow.

Having decoded the misalignment instruction, steps 5a–5f will execute the original replaced instruction and take any additional appropriate action (i.e., turn Instruction Cache on/off, etc.) as also shown. Once any one of the steps 5a–5f has been completed, the exception routine 35 restores the original state of the Data Cache and then reads the start of the exception routine +2, i.e., address 606 in the exemplary code listings included hereinbelow, as shown at step 6, to indicate to the bus/state analyzer that the exception routine has been exited. The Data Cache is then re-enabled in step 7. Step 8 returns to the instrumented function 29 at the next instruction after the misalignment instruction (i.e., the instruction subsequent to the address in the SRR0 register).

The TAGS or MARKERS provided by steps 2 and 6 discussed hereinabove may be preferably utilized by the external bus/state analyzer to control output displayed by display module 14, in accordance with the triggering arrangement shown in the following Table 3:

TABLE 3

| Instruction | Decoded Meaning |
| --- | --- |
| 80 L0.0 if address = 602 then goto L1 | when address read occurring on bus = entry to exception routine (i.e., 602) goto level 1 and look for events L1.0 or L1.1 |
| 82 L1.0 if read then trace cycle | trace all read cycles while event system is at level 1 |
| 84 L1.1 if address = 606 then goto L0 | when address read occurring on bus = entry to exception routine +2 (i.e., 606) goto to level 0 and wait for event L0.0 |

The above triggering arrangement signals the external bus/state analyzer when to display the output provided by the present invention. Such a triggering arrangement is particularly useful when the event program code 28 is executing with either or both Data and Instruction Caches disabled prior to entry of exception routine 35. In such an event, since the entire program code 28 may be executing on the bus where it is visible, this triggering arrangement may be advantageously utilized to specifically identify execution of the selected function 29.

Having described an embodiment of the present invention, various functionality thereof will be described. In the event the present invention is configured to indicate only entry and exit of a particular function 29, the exception routine 35 is executed once, utilizing step 5a to indicate entry to the function 29. The exception routine then branches back to the next instruction after the preamble to permit the function 29 to execute in a conventional manner until the misalignment instruction 32 is reached, at which time the exception routine 35 is executed a second time, utilizing step 5d to indicate exit from the function 29. In this event, after indication that the function 29 has been entered, the function 29 will continue to execute in cache until the processor attempts to read the substituted instruction 32 at the postamble. When this occurs, a second misalignment exception is generated at which point the processor branches back to the vector table 34 (and exception routine 35) to provide the user with an indication that the function 29 is being exited by the microprocessor. The routine 35 will then be exited, branching to the instruction subsequent to the postamble of the function 29, followed by restoring the value originally in r0 to the link register to effectively branch the processor back to the main program code (calling function) 28. The calling function 28 will then operate in a conventional, fully cached mode to operate at full efficiency and speed.

Additional functionality, such as providing a trace with or without trace of other functions (i.e., calls or children) called by function 29 may be provided. This may be implemented by using modules 22 and 24 to individually locate any branches to such children, and replace the preambles and postambles of such children, (regardless of whether or not they fall within the address range selected by the user), substantially as described hereinabove. For example, a function 29 (and calls) may be traced by substituting instructions 31 and 33 into function 29 and its children as described hereinabove. Similarly, function 29 may be traced without calls by substituting instructions 31 and 33 into function 29, while substituting instructions 37 and 39 into the preambles and postambles, respectively, of any children of function 29. In this latter example, the Instruction Cache will be enabled upon entry to each of the children to prevent them from being traced, and then disabled upon exit therefrom to continue tracing the parent function 29.

Exemplary program code listings of the exception routine 35 of the present invention for use with 6xx and 8xx Motorola® PowerPC™ microprocessors are included hereinbelow.

Figure 3:
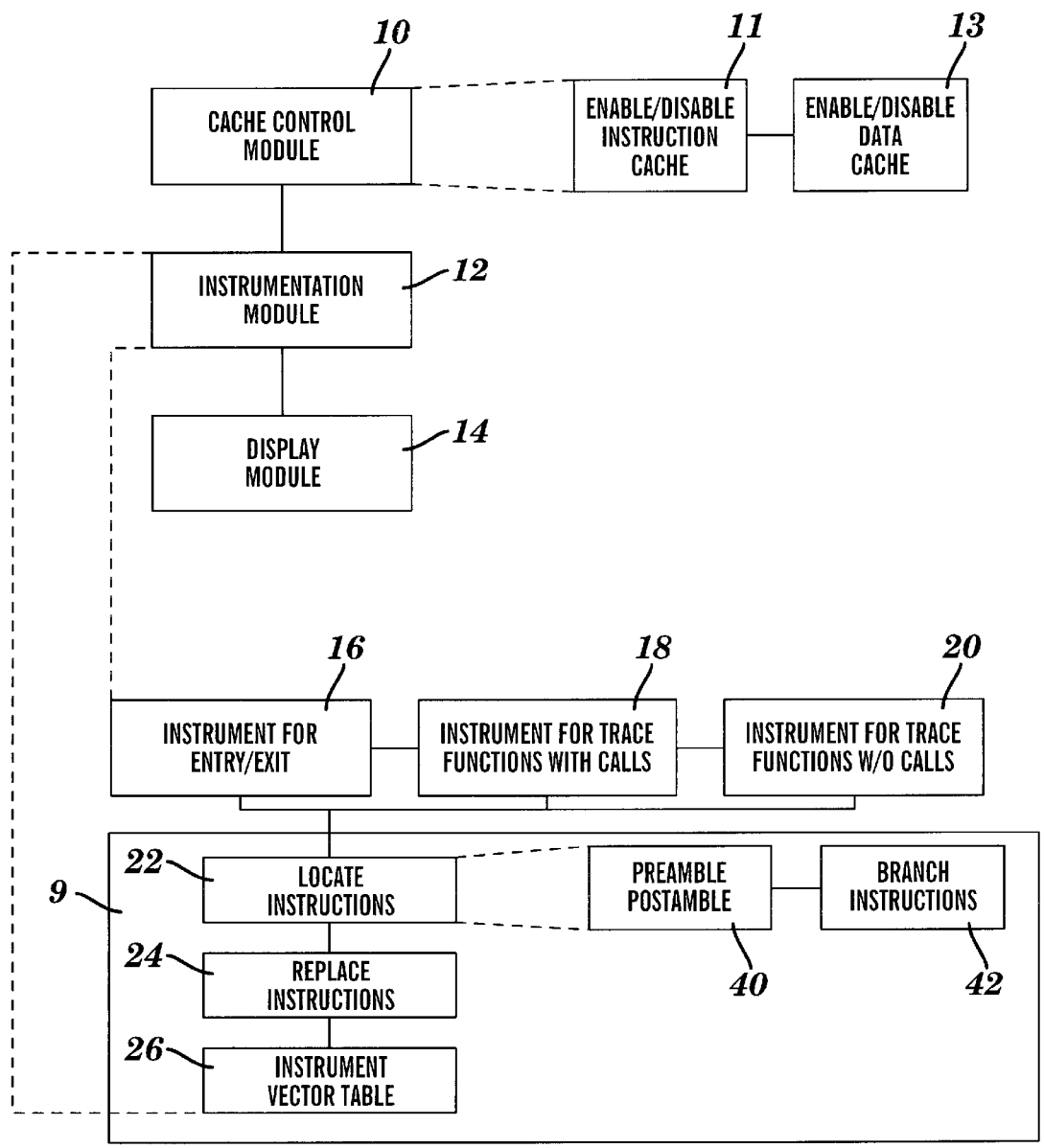
FIG. 3 is an expanded block diagram/flowchart of an embodiment of the present invention including the code monitoring system of FIG. 1.

Turning now to FIG. 3, a preferred embodiment of the present invention is shown and described in block diagram format. As shown, a conventional cache control module 10 may be utilized in combination with the present invention to enable a user to selectively enable or disable Instruction Cache and/or Data Cache as indicated at blocks 11 and 13, respectively. The cache control module 10 is preferably coupled to instrumentation module 12 of the present invention. The instrumentation module preferably includes an Entry/Exit instrumentation module 16, a Trace Functions With Calls module 18 and a Trace Functions Without Calls module 20. Modules (i.e, menu commands) 16, 18 and 20 are individually selectable by a user utilizing a conventional graphical user interface (GUI), as may be provided in Display Module 14 discussed hereinbelow. Each module 16, 18 and 20 is coupled to the instrumentation block 9 which includes modules 22, 24 and 26 as described hereinabove and which operate in a predetermined manner dependent upon which instruction or module 16, 18 and 20 is selected by the user. In this regard, instruction locating module 22 includes a preamble/postamble locating block 40 for locating instructions disposed in the preamble and/or postamble of a function, such as the MFSPR and MTSPR instructions discussed hereinabove. A branch instruction module 42 is also included to locate branch instructions and thus provide the Trace With Calls functionality associated with module 18.

Instrumentation module 12 is coupled to a display module 14 which as mentioned hereinabove, may include a conventional graphical user interface (GUI) to generate screen displays of both the user selectable functions as well as the code executing on the bus of the target processor.

Figure 4:
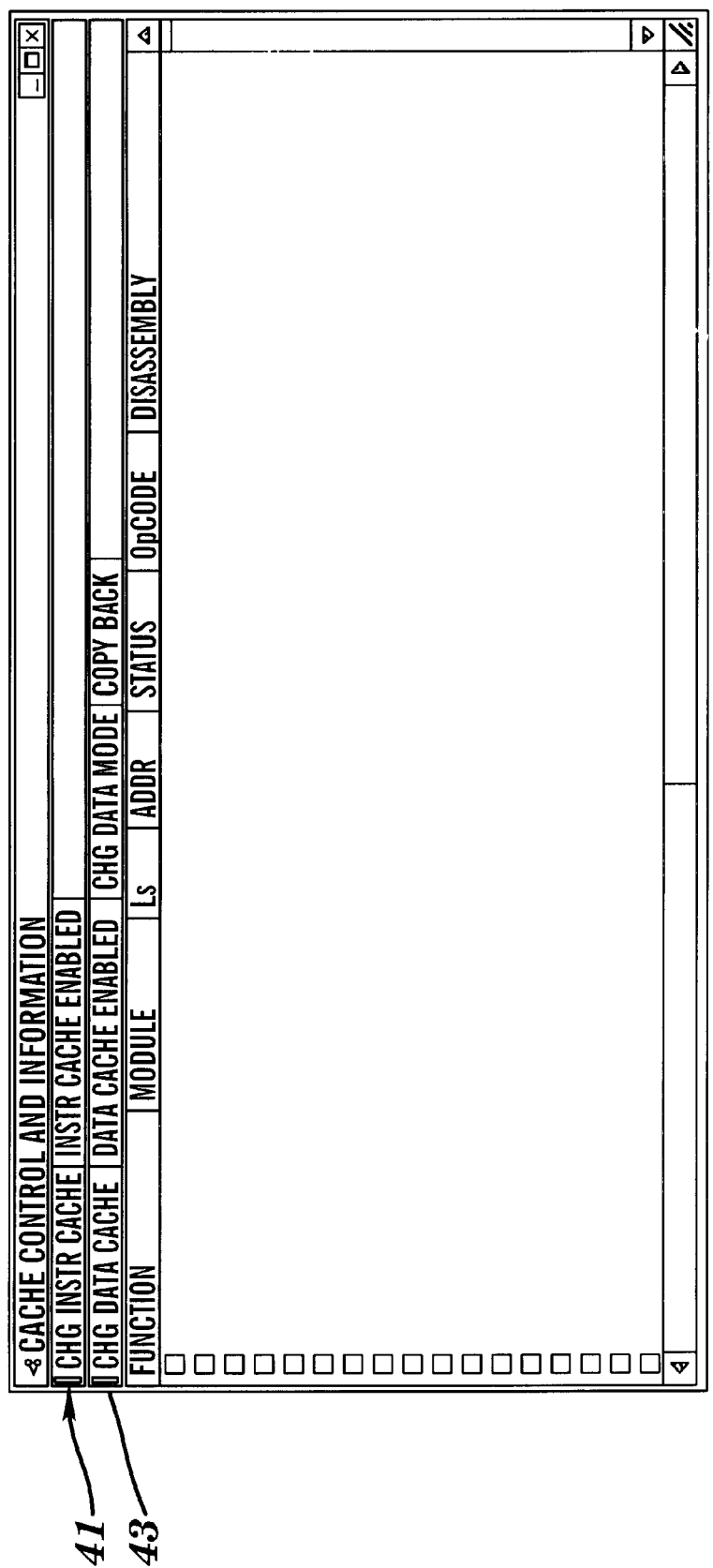
FIG. 4 is a screen display of a step in the operation of the present invention.

As shown in FIG. 4, the cache control module 10 may be operated using a GUI interface generated by display module 14 to either enable or disable Instruction Cache and/or Data Cache using instruction and Data Cache toolbars 41 and 43, respectively. Once disabled, all instruction fetches and/or reads and writes will occur on the bus and thus be displayed as shown, for example, in FIG. 5.

Figure 5:
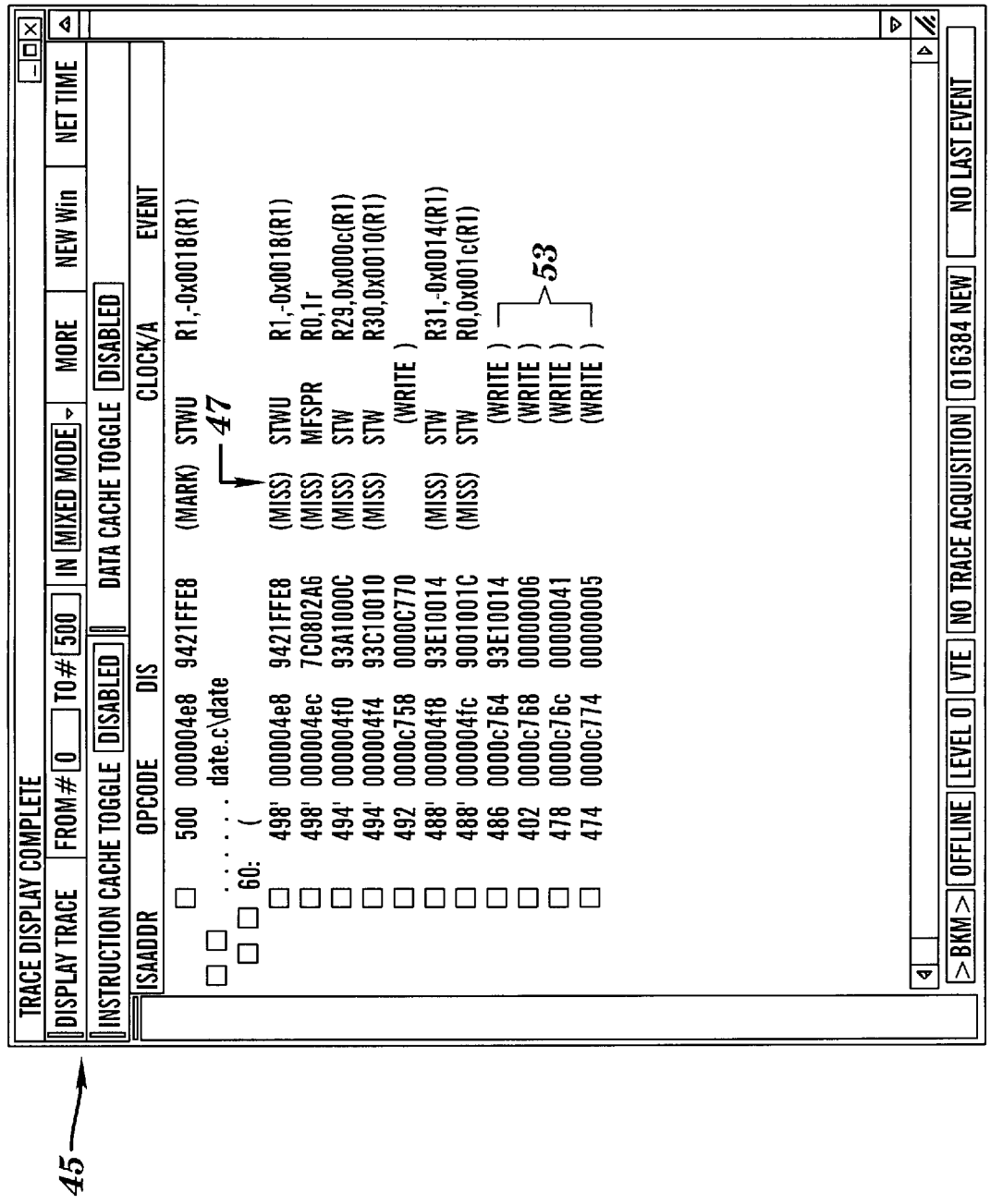
FIG. 5 is a screen display showing results of the operation of the present invention.

Turning to FIG. 5, both Instruction Cache and Data Cache have been disabled as shown at display line 45. As also shown, instruction fetch cycles occurring on the bus are indicated with a "miss" designation 47 to indicate that cache was missed. Moreover, all read cycles and write cycles are displayed with the words "read" (not shown) or "write" as at 53 when the Data Cache is disabled.

An exemplary embodiment of the present invention having been described, the following is a more detailed description of some of the operations thereof as displayed to a user.

In general, cache may be initially disabled and enabled by invoking cache control module 10 or a similar device as shown in FIG. 4. A user may then operate the present invention by selecting module (menu command) 16, 18, or 20 as will be shown and described with respect to FIGS. 6–11 hereinbelow. The code 28 to be debugged then may be run on the target processor as desired and a trace thereof may be displayed by the display module 14.

Figure 6:
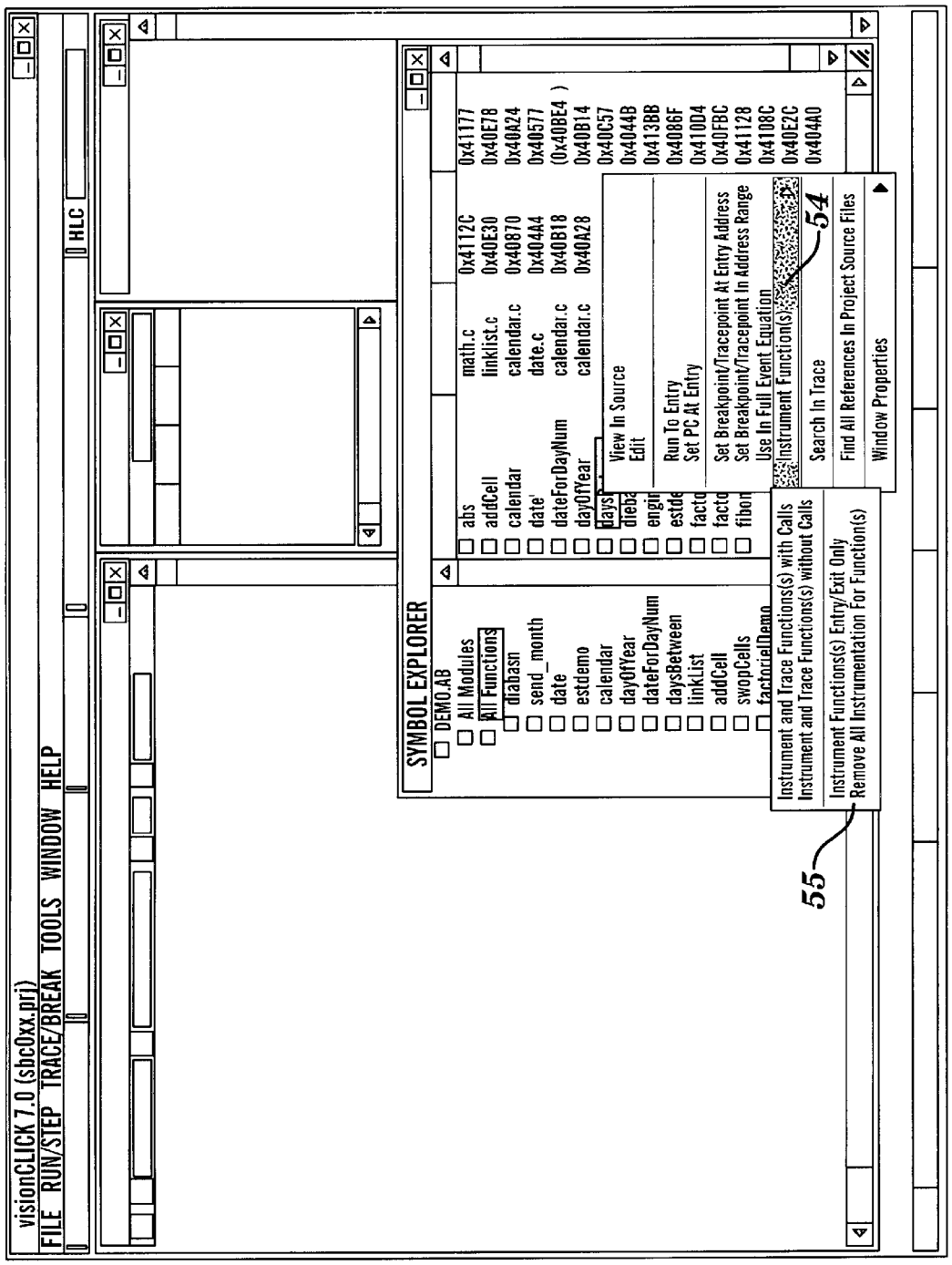
FIG. 6 is a screen display of an additional step in the operation of the present invention.
Figure 7:
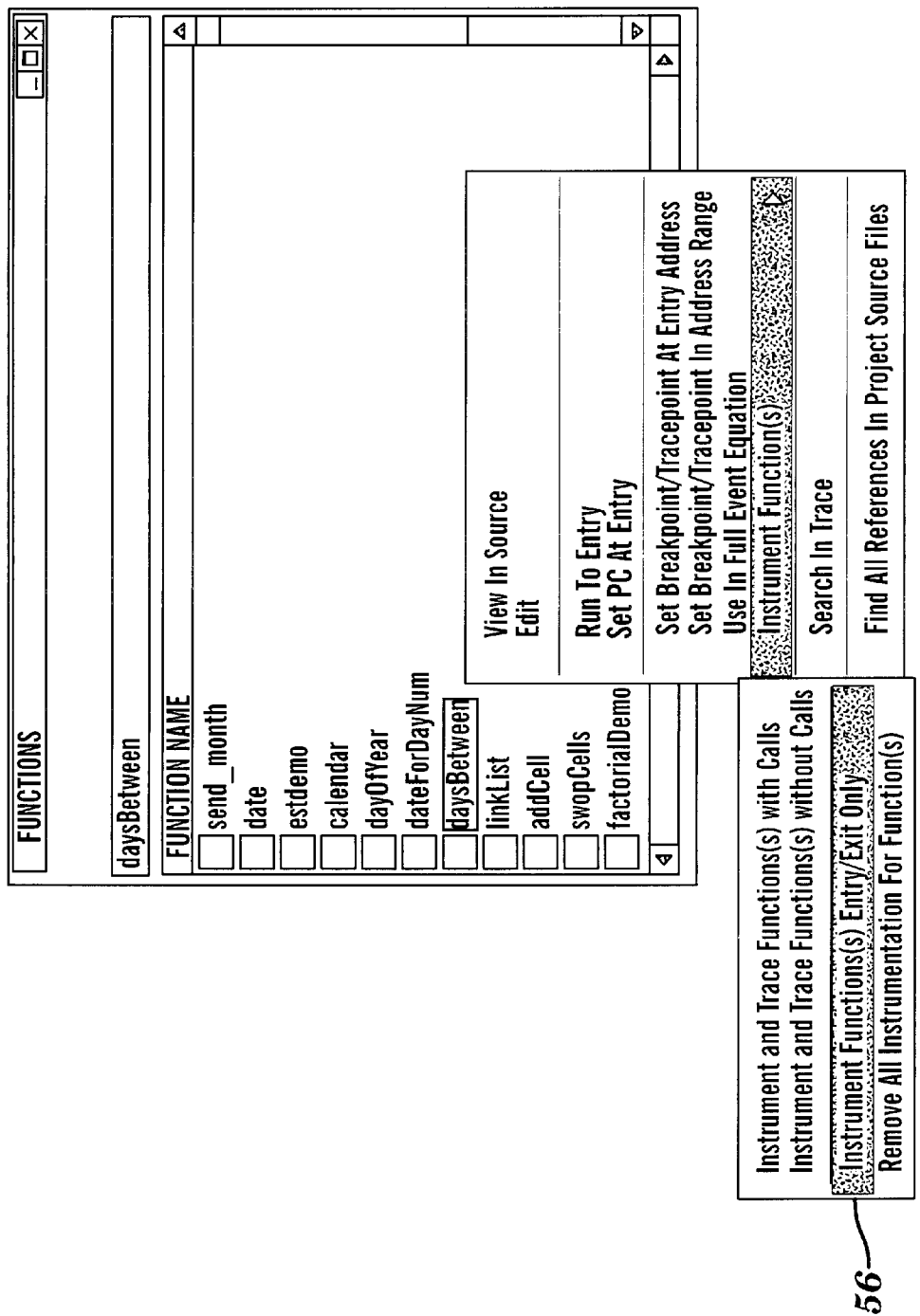
FIG. 7 is a screen display of a further step in the operation of the present invention.
Figure 9:
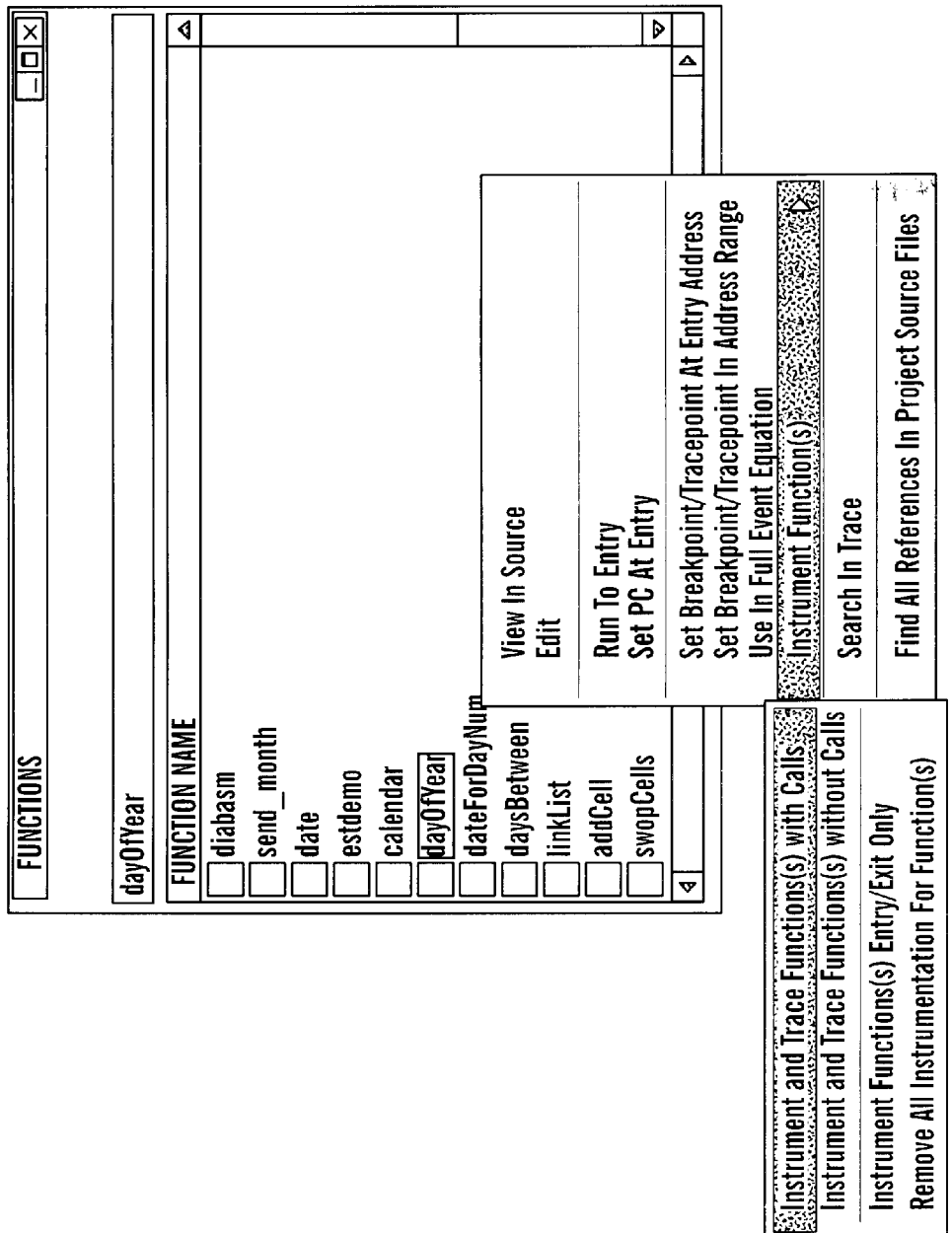
FIG. 9 is a screen display of a further step in the operation of the present invention.
Figure 10:
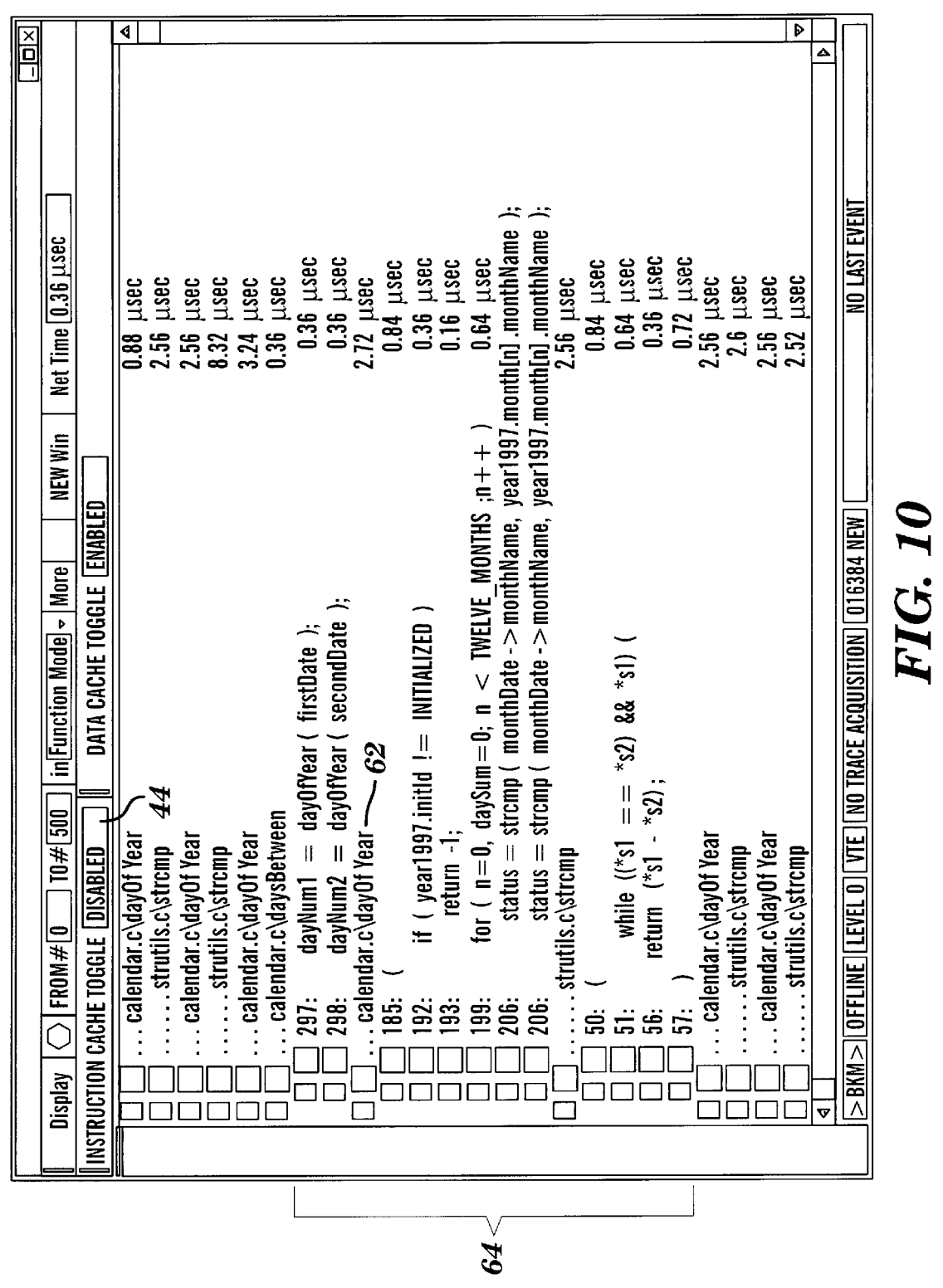

Turning to FIG. 6, in a preferred embodiment, specific functions to instrument and trace may be selected as at 54 which in turn activates an Instrument Functions menu 55 generated by instrumentation module 12 (FIG. 3). Turning to FIG. 7, selecting the Entry/Exit Only command 56 invokes Entry/Exit module 16 (FIG. 3) to capture every instance within a desired address range in which a selected function is called. In a preferred embodiment, any function that called the selected function also may be indicated. This command 56 is useful for tracing function/performance information, such as time stamp and sequence information. FIG. 8 is an example of an output generated by use of the Entry/Exit Only function 56. In this example, the function "daysBetween" has been instrumented for only Entry/Exit. Each Entry/Exit is indicated by the display of "c\daysBetween" as at 57 (which indicates that the function has been called). Also visible is the function "calender" (as at 61) because it called the function "daysBetween". A user may "drill down" by actuating (i.e., clicking) on the '+' icon in a manner known to those familiar with Microsoft® software, such as "Microsoft® Explorer™", to show expanded detail such as the opened and closed brackets 58 and 59 which correspond to Entry and Exit of a function, respectively. In the example shown, only one instance of Entry/Exit has been shown in expanded detail. Turning to FIG. 9, the instruction Instrument and Trace Functions with Calls 60 may be selected by the user to invoke module 18 (FIG. 3) to provide more detailed visibility into the executing code. This provides entire program flow for instrumented functions and also for nested functions (i.e., calls or children) of the instrumented function(s), as shown in FIG. 10. Turning to FIG. 10, the function "dayOfYear" 62 is instrumented and trace is also displayed for all other nested functions as shown at 64. The Instruction Cache toolbar 44 is displayed as "disabled" because cache is disabled for this particular routine thus permitting instruction fetches occurring on the bus to be captured.

Figure 11:
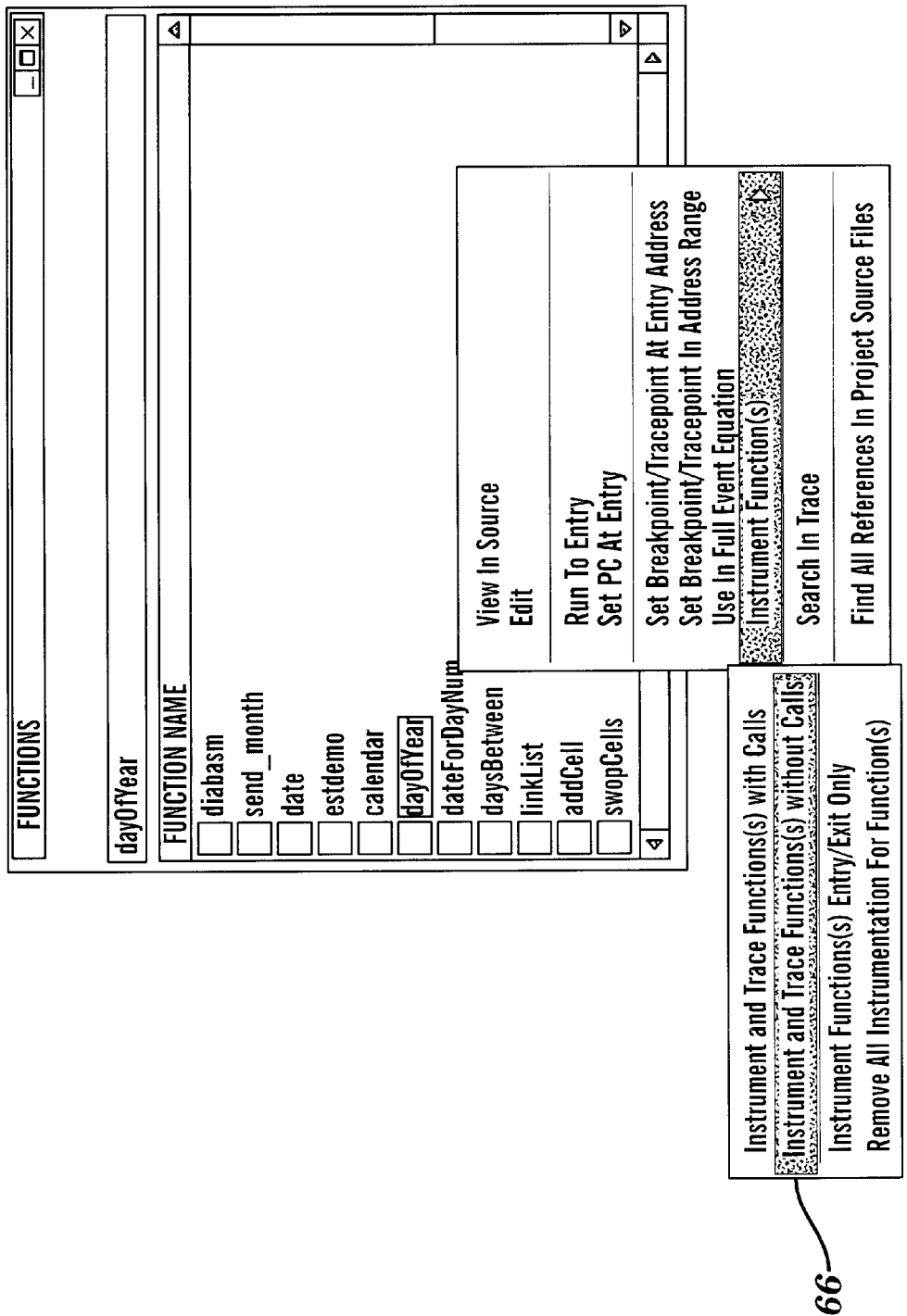
FIG. 11 is a screen display of a further command step in the operation of the present invention.

Turning now to FIG. 11, the instruction Instrument and Trace Function(s) Without Calls 66 may be selected to invoke module 20 (FIG. 3) to view program flow of a function (e.g., dayOfyear) without full trace for associated calls. When selected, Entry/Exit visibility for calls associated with the selected function is provided as at 68 and 70 of FIG. 12, with the trace of the function shown in expanded form at 72.

The present invention is advantageously capable of being utilized with various target processors regardless of whether or not they include specific debugging/emulation tools or systems integrated therein. Moreover, the invention does not necessitate increasing the size (lines) of executable code being debugged, and is capable of monitoring the execution of individual code instructions by selectively disabling and enabling portions of the code, while permitting remaining portions of the code to run at full (cache enabled) speed.

Moreover, although the present invention has been described hereinabove as utilized with an external bus/state analyzer to capture information on the bus, it should be recognized by those skilled in the art that the present invention may be utilized in combination with a software system which may store the desired information (i.e., entry/exit markers and/or traces, etc.) within a circular buffer which would automatically cycle to keep the latest executed instructions therein. In this manner, the present invention may be implemented in combination with a bus/state analyzer implemented in hardware, software, or a combination thereof.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

This Appendix A includes program code listings for two exemplary embodiments of the exception routine of the present invention configured for Motorola® 8xx and 6xx series PowerPC™ microprocessors, respectively.

APPENDIX A

This Appendix A includes program code listings for two exemplary embodiments of the exception routine of the present invention configured for Motorola ® 8xx and 6xx series PowerPC ™ microprocessors, respectively.

8xx Version

```
###################################################################
#=

#              Copyright © 1999 Embedded Support Tools Corp

#=20
###################################################################
########
        .file     "inst.s"
        .include  "inc/vars.h"    # common variable definitions
###################################################################
########
        .text
        .globl    START
        .globl    _main
###################################################################
########
#   Exception Vector Table Structure.
###################################################################
########
VecStart:
_main:
```

APPENDIX A-continued

This Appendix A includes program code listings for two exemplary embodiments of the exception routine of the present invention configured for Motorola ® 8xx and 6xx series PowerPC ™ microprocessors, respectively.

```
        .skip   0x0600-(.-VecStart)      #
################################################################################
#   Instrumented code exception service routine at 0x0600
################################################################################
#    0x1/0x4001/0x4011 -    602/606
#    0x11/0x21/0x4021 -     602/60a
_start:
EstVec:
---Save r10 register ----
        stw     r10, 0x4(r1)             #   save r10 register value to stack
        mfspr   r10, dccst               #   get the current state of the D cache
        rnfspr  r11, dccst               #   get the current state of the D cache
EstVec4:
#   ---Shut off D Cache ----
        lis     r11, 0x0400              #   mask of 0x040000000(shut off D cache)=09
        mtspr   dccst, r11               #   this allows the mark command to appear
#   ---read 602 ----
        addis   r11, 0, EstVec@h         #   get the address of exception
        addi    r11, r11, 0x0602         #   get the rest of address
        lhz     r11, 0(r11)              #   read half word (2 bytes) from address
#   ---read LMW ----
        mfspr   r11, srr0                #   Get the address of the misalignment instruction
        lwz     r11, 0(r11)              #   Read the patched LMW instruction
        andi.   r11, r11, 0xffff         #   Zero out upper bits
#   ---Read In I Cache ----
        mfspr   r12, iccst               #   get the current state of the I cache
c_inst_entry:
        cmpi    0, 0, r11, 0x0001        #   Check for inst entry point
        beq     Func_entry               #   all done
        cmpi    0, 0, r11, 0x4001        #   check for inst exit point
        beq     Func_exit                #   all done=09
        cmpi    0, 0, r11, 0x4011        #   check for trc on exit point
        beq     enable_I_cache           #   enable I Cache
#    ---- flag for 0x60a ----             #   0x21/0x11/0x4021 =09
        ori     r10, r10, 0x0004         #   flag for read from 0x60a
        cinpi   0, 0, r11, 0x0011        #   check for trc on entry point
        beq     disable_I_cache          #   disable I Cache
        cmpi    0, 0, r11, 0x4021        #   check for trc off exit point
        beq     disable_I_cache          #   disable I Cache
        cmpi    0, 0, r11, 0x0021        #   check for trc off entry point
        beq     enable_I_cache           #   enable I Cache
        b       Func_exit                #   unknown- set to exit=09
disable_I_cache:
        andis.  r12, r12, 0x7f00         #   DEN=3D0
        oris    r12, r12, 0x400          #   Disable instruction cache
        cmpli   0, 0, r11, 0x4000        #   check if < 0x4000L
        bc      4, 0, Func_exit          #   if not, function Exit
        b       Func_entry               #=20
enable_I_cache:
        oris    r12, r12, 0x200          #   Enable Instruction caches
        cmpli   0, 0, r11, 0x4000        #   check if < 0x4000L
        bc      4, 0, Func_exit          #   if not, function Exit
        b       Func_entry               #
Func_entry:
        Mfspr   r0, 1r                   #   execute replaced instruction
        and.    r11, r0, r0              #   move r0 (LR) into r11
        lwz     r11, 0(r11)              #   Read the LR address
        b       EstVec_exit
Func_exit:
        Mtspr   1r, r0                   #   execute replaced
```

APPENDIX A-continued

This Appendix A includes program code listings for two exemplary embodiments of the exception routine of the present invention configured for Motorola ® 8xx and 6xx series PowerPC ™ microprocessors, respectively.

```
                                                        instruction
EstVec_exit:
        or      r11, r10, r10           #   save r10 to r11
        andi.   r10, r10, 0x000f        #   Only keep lower 4 bits
        cmpli   0, 0, r10, 0x0004       #   check if =3D=3D 0x0004L
        bne     read_606
        or      r10, r11, r11           #   restore r10 from r11
        addis   r11, 0, EstVec4@h       #   get the address to
                                            indicate end of function
        addi    r11, r11, 0x060a        #   get the rest of next
                                            address
        b       read_60a
read_606:       =09
        or      r10, r11, r11           #   restore r10 from r11
        addis   r11, 0, EstVec4@h       #   get the address to
                                            indicate end of function
        addi    r11, r11, 0x0606        #   get the rest of next
                                            address
read_60a:
        lhz     r11, 0(r11)             #   read half word (2 bytes)
from address
        mfspr   r11, srr0               #   Wanta return passed the
                                            LMW instruction.
        addi    r11, r11, 0x0004        #   Add 4
        mtspr   srr0, r11               #   restore srr0
        mtspr   iccst, r12              #   set up I cache
        or      r11, r10, r10           #   copy r10 to r11
        rlwinm  r11, r11, 0, 0, 0
        cmpi    0, 0, r11, 0x0000
        bc      12, 2, load_dccst       #   done if it's not equal
                                            to 0x8000
dccst_en:
        oris    r10, r10, 0x0200        #   it's 0x8000, or with
                                            0x2000000 (cache
                                            enable)=09
load_dccst:     =20
        mtspr   dccst, r10              #   restore D cache
        lwz     r10, 0x4(r1)            #   restore r10 register
                                            from stack
        rfi
#######################################################################

        .end
------=_NextPart_000_0019_01BE76E9.2E9F4540
Content-Type: application/octet-stream;
        name="inst6xx.s"
        Content-Transfer-Encoding: quoted-printable
        Content-Disposition: attachment;
        filename="inst6xx.s"
                                6xx Version

#######################################################################
#############=

#               Copyright © 1999 Embedded Support Tools Corp

#=20
#######################################################################

        .file   "inst.s"
        .include "inc/vars.h"           #   common variable definitions
#######################################################################

        .text
        .globl  START
        .globl  _main
#######################################################################

#       Exception Vector Table Structure.
#######################################################################

VecStart:
_main:
        .skip   0x0600-(.-VecStart)     #
```

APPENDIX A-continued

This Appendix A includes program code listings for two exemplary embodiments of the exception routine of the present invention configured for Motorola ® 8xx and 6xx series PowerPC ™ microprocessors, respectively.

```
##################################################################

#    Instrumented code exception service routine at 0x0600
##################################################################

#    0x11/0x21/0x4021 -   read 0x60a
#    0x1/0x4001/0x4011 -  read 0x606
_start:
EstVec:
---Save r10 register ----
        stw     r10, 0x4(r1)            #  save r10 register value
                                           to stack
        mfspr   r10, hid0               #  get the current state
                                           of the cache
        mfspr   r11, hid0               #  make a copy to r11
#    --- Shut off D Cache ----
        lis     r12, 0xffff             #  setting up a mask of
                                           0xffffbffff=09
        li      r12, 0xbfff
        and     r11, r11, r12           #  shut off the data cache
        mtspr   hid0, r11               #  this allows the mark
                                           command to appear
        or      r12, r10, r10           #  get original hid0 value
from r10
#    ---read 602 ----
        addis   r11, 0, EstVec@h        #  get the address of
                                           exception
        addi    r11, r11, 0x0602        #  get the rest of address
        lhz     r11, 0(r11)             #  read half word (2 byte)
address
#    ---read LMW ----
        mfspr   r11, srr0               #  Get the address of the
misalignment instruction
        lwz     r11, 0(r11)             #  Read the patched LMW
instruction
        andi.   r11, r11, 0xffff        #  Zero out upper bits
c_inst_entry:
        cmpi    0, 0, r11, 0x0001       #  Check for inst entry
                                           point
        beq     Func_entry              #  all done
        cmpi    0, 0, r11, 0x4001       #  check for inst exit
                                           point
        beq     Func_exit               #  all done=09
        cmpi    0, 0, r11, 0x4011       #  check for trc on exit
                                           point
        beq     enable_I_cache          #  enable I Cache
#    ---- flag for 0x60a ----         #  0x21/0x11/0x4021    =09
        ori     r10, r10, 0x0004        #  flag for read from
0x60a
        cmpi    0, 0, r11, 0x0021       #  check for trc off entry
                                           point
        beq     enable_I_cache          #  enable I Cache
        cmpi    0, 0, r11, 0x0011       #  check for trc on entry
                                           point
        bne     chk_trcoff_exit
        lis     r11, 0xffff             #  setting up a mask of
0xffff7fff=09
        addi    r11, r11, 0x7fff
        and     r12, r12, r11           #  Disable instruction
                                           cache
        b       Func_entry
chk_trcoff_exit:
        cmpi    0, 0, r11, 0x4021       #  check for trc off exit
                                           point
        bne     Func_exit               #  unknown- set to exit=09
        lis     r11, 0xffff             #  setting up a mask of
                                           0xffff7fff=09
        addi    r11, r11, 0x7fff
        and     r12, r12, r11           #  Disable instruction
                                           cache
        b       Func_exit               #  must be 0x4011 (trc on
                                           exit)
enable_I_cache:
        ori     r12, r12, 0x8000        #  Enable Instruction
                                           caches
```

APPENDIX A-continued

This Appendix A includes program code listings for two exemplary embodiments of the exception routine of the present invention configured for Motorola ® 8xx and 6xx series PowerPC ™ microprocessors, respectively.

```
          cmpi     0, 0, r11, 0x0021        #   check for trc off entry
                                                point
          bne      Func_exit                #   must be 0x4011 (trc on
                                                exit)
Func_entry:
          Mfspr    r0, 1r                   #   execute replaced
                                                instruction
          and.     r11, r0, r0              #   move r0(LR) into r11
          lwz      r11, 0(r11)              #   Read the LR address
          b        EstVec_exit
Func_exit:
          Mtspr    1r, r0                           #   execute replaced
instruction
EstVec_exit:
          or       r11, r10, r10            #   set r11=3Dr10
          rlwinm   r10, r10, 0, 17, 17      #   check bit 17 (dce)
          cmpi     0, 0, r10, 0x0000        #   check if dce=3D0
          bc       12, 2, dccst_dis         #   yes, just exit
dccst_en:
          ori      r12, r12, 0x4000         #   set dce to enable
dccst_dis:
          or       r10, r11, r11            #   set r10=3Dr11
          andi.    r10, r10, 0x000f         #   Only keep lower 4 bits
          addis    r11, 0, EstVec@h         #   get the address to
                                                indicate end of function
          addi     r11, r11, 0x0606         #   get the rest of address
          add      r11, r11, r10            #   r11=3Dr11+r10 (0x0 or
                                                0x2)
          lhz      r11, 0(r11)              #   read half word (2 byte)
address
          mfspr    r11, srr0                #   Wanta return passed the
                                                LMW instuction.
          addi     r11, r11, 0x0004         #   Add 4
          mtspr    srr0, r11                #   restore srr0
          mtspr    hid0, r12                #   restore D cache
          lwz      r10, 0x4(r1)             #   restore r10 register
                                                from stack
          rfi
################################################################

          .end
```

What is claimed is:

1. A method for monitoring software code being executed in a target system having a bus and cache, said method comprising the steps of:
(a) searching a range of addresses within the software code to identify a desired instruction;
(b) replacing the desired instruction with an exception-generating instruction;
(c) inserting an exception routine into an exception vector table, the exception routine having a cache-disabling instruction and a branch instruction branching to an address of the software code subsequent to the exception-generating instruction; and
(d) executing the software code.

2. The method of claim 1, wherein at least a portion of the software code executes externally of the cache.

3. The method of claim 1, wherein at least a portion of the software code executes on the bus.

4. The method of claim 1, wherein said searching step (a) further comprises searching for a plurality of desired instructions.

5. The method of claim 1, wherein the exception routine further comprises a cache re-enabling instruction.

6. The method of claim 1, wherein said searching step (a) further comprises searching for a desired instruction disposed in a preamble of a program segment.

7. The method of the claim 6, wherein the desired instruction comprises a Move From Special Register instruction.

8. The method of claim 6, wherein said searching step (a) further comprises searching for an other desired instruction disposed in a postamble of a program segment.

9. The method of claim 8, wherein the other desired instruction comprises a Move To Special Register instruction.

10. The method of claim 1, wherein said inserting step (c) further comprises inserting an exception routine having a Data Cache-disabling instruction.

11. The method of claim 1, wherein said inserting step (c) further comprises inserting an exception routine having an Instruction Cache-disabling instruction.

12. The method of claim 1, wherein said searching step (a) further comprises the steps of searching for a branch instruction, and searching for the desired instruction in a portion of the software code indicated by the branch instruction, wherein the desired instruction disposed outside of the range of addresses is identified.

13. The method of claim 1, wherein the desired instruction comprises an EABI instruction.

14. The method of claim 1, wherein the exception generating instruction comprises an instruction to read from an odd address.

15. The method of claim 14, wherein the exception generating instruction comprises an instruction to add an odd integer to an address.

16. The method of claim 15, wherein the exception routine has a decoding instruction to identify the odd integer and execute an instruction corresponding thereto.

17. The method of claim 16, further comprising a plurality of exception generating instructions each having an instruction to add one of a plurality of discrete odd integers to an address, said plurality of discrete odd integers respectively corresponding to a plurality of user-selectable operations.

18. The method of claim 17, wherein each of said plurality of user-selectable operations is selected from the group consisting of:

indicating entry and exit of a function;

indicating entry and exit of a function and tracing execution of a function;

indicating entry and exit of a function, tracing execution of the function, and indicating entry and exit and tracing execution of other functions called by the function; and indicating Entry and Exit of a function, tracing execution of the function, and indicating Entry and Exit without tracing execution of other functions called by the function.

19. The method of claim 16, wherein:

the exception-generating instruction comprises an instruction to add a first odd integer to an address of a desired instruction disposed in a preamble of a function, and to add a second odd integer to an address of an other desired instruction disposed in a postamble of the function; and the decoding instruction is adapted to output an indication that the function was entered when the first odd integer is read, and to output an indication that the function was exited when the second odd integer is read.

20. The method of claim 19, wherein:

the exception-generating instruction further comprises an instruction to add a third odd integer to an address of a desired instruction disposed in the preamble of a function, and to add a fourth odd integer to an address of an other desired instruction disposed in the postamble of a function;

the decoding instruction is adapted to output an indication that the function was entered when the third odd integer is read, and to output an indication that the function was exited when the fourth odd integer is read; and wherein said first and second odd integers are added when a first user selectable operation is selected, and said third and fourth odd integers are added when a second user selectable operation is selected.

21. The method of claim 20, wherein said first user-selectable operation comprises indicating entry and exit of the function.

22. The method of claim 20, wherein said second user-selectable operation comprises indicating entry and exit of the function and tracing the execution of the function.

23. The method of claim 20, wherein:

the exception-generating instruction further comprises an instruction to add the third odd integer to an address of a desired instruction disposed in the preamble of at least one other function called by the function, and to add the fourth odd integer to an address of an other desired instruction disposed in the postamble of the at least one other function;

the decoding instruction is adapted to output an indication that the at least one other function was entered when the third odd integer is read, and to output an indication that the at least one other function was exited when the fourth odd integer is read; and wherein said third and fourth odd integers are added to the at least one other function when a third user selectable operation is selected.

24. The method of claim 23, wherein said third user-selectable operation comprises indicating entry and exit and tracing execution of the function, and indicating entry and exit and tracing execution of the at least one other function called by the function.

25. The method of claim 20, wherein:

the exception-generating instruction further comprises an instruction to add a fifth odd integer to an address of a desired instruction disposed in the preamble of at least one other function called by the function, and to add a sixth odd integer to an address of an other desired instruction disposed in the postamble in the at least one other function;

the decoding instruction is adapted to output an indication that the at least one other function was entered when the fifth odd integer is read, and to output an indication that the at least one other function was exited when the sixth odd integer is read; and wherein said fifth and sixth odd integers are added when a fourth user selectable operation is selected.

26. The method of claim 25, wherein said fourth user-selectable operation comprises indicating entry and exit and tracing the function, and indicating entry and exit of the at least one other function without tracing execution of the at least one other function.

27. A method for monitoring software code being executed in a target system having a bus and cache, said method comprising the steps of:

(a) searching a range of addresses within the software code to identify preamble and postamble instructions;

(b) replacing the preamble instruction with a misalignment instruction;

(c) replacing the postamble instruction with an other misalignment instruction;

(d) inserting an exception routine into an exception vector table executable upon a branch from a faulted address, the exception routine having a cache-disabling instruction, an instruction to execute the instruction replaced from the faulted address, a branch instruction branching to an address of the software code subsequent to the faulted address, and a decoding instruction to indicate entry of a function when the address of the misalignment instruction is faulted and to indicate exit of a function when the address of the other misalignment instruction is faulted; and (e) executing the software code, wherein at least a portion of the software code will execute externally of the cache.

28. A system for monitoring software code being executed in a target having a bus and cache, said system comprising:

an instruction locating module to search a range of addresses within the software code to identify a desired instruction;

an instruction replacement module to replace the desired instruction with an exception-generating instruction; and a vector table instrumentation module to insert an exception routine into an exception vector table, the exception routine having a cache-disabling instruction and a branch instruction branching to an address of the software code disposed subsequent to the exception-generating instruction.

29. An article of manufacture for monitoring software code being executed in a target processor having a bus and cache, said article of manufacture comprising:
   a computer usable medium having a computer readable program code embodied therein, said computer usable medium having:
   computer readable program code for searching a range of addresses within the software code to identify a desired instruction;
   computer readable program code for replacing the desired instruction with an exception-generating instruction; and
   computer readable program code for inserting an exception routine into an exception vector table, the exception routine having a cache-disabling instruction and a branch instruction branching to an address of the software code disposed subsequent to the exception-generating instruction.

30. Computer readable program code for monitoring software code being executed in a target processor having a bus and cache, said computer readable program code comprising:
   computer readable program code for searching a range of addresses within the software code to identify a desired instruction;
   computer readable program code for replacing the desired instruction with an exception-generating instruction; and
   computer readable program code for inserting an exception routine into an exception vector table, the exception routine having a cache-disabling instruction and a branch instruction branching to an address of the software code disposed subsequent to the exception-generating instruction.

* * * * *